(12) United States Patent
Srinivasan et al.

(10) Patent No.: US 10,902,684 B2
(45) Date of Patent: Jan. 26, 2021

(54) MULTIPLE USERS DYNAMICALLY EDITING A SCENE IN A THREE-DIMENSIONAL IMMERSIVE ENVIRONMENT

(71) Applicant: MICROSOFT TECHNOLOGY LICENSING, LLC, Redmond, WA (US)

(72) Inventors: Vidya Srinivasan, Issaquah, WA (US); Andrew John Howe, Sammamish, WA (US); Edward Boyle Averett, Bellevue, WA (US); Harold Anthony Martinez Molina, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 69 days.

(21) Appl. No.: 15/984,236

(22) Filed: May 18, 2018

(65) Prior Publication Data

US 2019/0355181 A1 Nov. 21, 2019

(51) Int. Cl.
*G06T 19/20* (2011.01)
*G06F 3/0481* (2013.01)
*G06F 3/0484* (2013.01)

(52) U.S. Cl.
CPC .......... *G06T 19/20* (2013.01); *G06F 3/04815* (2013.01); *G06F 3/04842* (2013.01);
(Continued)

(58) Field of Classification Search
CPC ............... G06T 19/20; G06T 2219/024; G06T 2219/012; G06T 2219/2004;
(Continued)

(56) References Cited

U.S. PATENT DOCUMENTS 7,107,549 B2 9/2006 Deaton et al.
7,606,741 B2 * 10/2009 King .................. G06F 16/41
705/27.2

(Continued)

FOREIGN PATENT DOCUMENTS

WO 2007020591 A2 2/2007

OTHER PUBLICATIONS

"Reality Developer Kit™", Retrieved From https://seebright.com/, Retrieved on: Mar. 27, 2018, 5 Pages.
(Continued)

*Primary Examiner* — Ryan Barrett
(74) *Attorney, Agent, or Firm* — Newport IP, LLC; Jacob P. Rohwer

(57) ABSTRACT

Techniques configured to enable multiple users to dynamically and concurrently edit a scene that is viewable in a three-dimensional immersive environment are described herein. The techniques use region locking so that content being edited by one user viewing and editing the scene in a three-dimensional immersive environment cannot be edited by another user concurrently viewing and editing the same scene in the three-dimensional immersive environment. Accordingly, a scene can be divided into multiple regions that can be locked to provide an element of protection against user interference that can result when two users are editing, or attempting to edit, the same content.

20 Claims, 9 Drawing Sheets

(52) U.S. Cl.
CPC .... G06F 3/04845 (2013.01); *G06T 2219/012* (2013.01); *G06T 2219/024* (2013.01); *G06T 2219/2004* (2013.01); *G06T 2219/2016* (2013.01)

(58) Field of Classification Search
CPC ......... G06T 2219/2016; G06F 3/04815; G06F 3/04845; G06F 3/04842
See application file for complete search history.

(56) References Cited

U.S. PATENT DOCUMENTS

| | | | |
|---|---|---|---|
| 7,958,453 B1* | 6/2011 | Taing | H04L 12/1827 709/204 |
| 2001/0007095 A1* | 7/2001 | Kehrle | G06T 17/10 703/2 |
| 2002/0065848 A1 | 5/2002 | Walker et al. | |
| 2008/0218512 A1* | 9/2008 | Alon | G06T 17/10 345/423 |
| 2009/0307189 A1 | 12/2009 | Bobbitt et al. | |
| 2010/0208033 A1 | 8/2010 | Edge et al. | |
| 2012/0233555 A1* | 9/2012 | Psistakis | G11B 27/034 715/751 |
| 2013/0124637 A1 | 5/2013 | Ko et al. | |
| 2013/0125029 A1* | 5/2013 | Miller | G06F 9/45529 715/760 |
| 2013/0135180 A1 | 5/2013 | Mcculloch et al. | |
| 2013/0239011 A1* | 9/2013 | Red | G06T 5/00 715/743 |
| 2014/0019986 A1* | 1/2014 | Reis | G06F 9/4843 718/102 |
| 2014/0047328 A1* | 2/2014 | Ruble | G06T 15/10 715/256 |
| 2016/0078683 A1 | 3/2016 | Sudol et al. | |
| 2016/0092462 A1 | 3/2016 | Raj et al. | |
| 2016/0246899 A1* | 8/2016 | Hirschtick | G06F 30/00 |
| 2016/0350609 A1 | 12/2016 | Mason et al. | |
| 2016/0358383 A1 | 12/2016 | Gauglitz et al. | |
| 2017/0076498 A1 | 3/2017 | Dakss et al. | |
| 2017/0186064 A1* | 6/2017 | Kaptsan | G06Q 50/01 |
| 2017/0269685 A1 | 9/2017 | Marks et al. | |
| 2017/0365103 A1* | 12/2017 | Nijlunsing | G06T 7/30 |
| 2018/0174364 A1* | 6/2018 | Copic | G06T 19/006 |
| 2019/0004684 A1* | 1/2019 | Pahud | G06F 3/0488 |
| 2019/0290398 A1* | 9/2019 | Kopelman | G06T 7/13 |
| 2019/0340832 A1* | 11/2019 | Srinivasan | G06F 3/0484 |
| 2020/0067997 A1* | 2/2020 | Hardee | H04L 67/22 |

OTHER PUBLICATIONS

Barakonyi, et al., "Augmented Reality Videoconferencing for Collaborative Work", In Proceedings of 2nd Hungarian Conference on Computer Graphics and Geometry, May 2003, 8 Pages.

Kasahara, et al., "Second Surface: Multi-user Spatial Collaboration System based on Augmented Reality", In Proceedings of 5th ACM SIGGRAPH Conference and Exhibition on Computer Graphics and Interactive Techniques in Asia, Nov. 28, 2012, 5 Pages.

Lindlbauer, et al., "Combining Shape-Changing Interfaces and Spatial Augmented Reality Enables Extended Object Appearance", In Proceedings of CHI Conference on Human Factors in Computing Systems, May 7, 2016, 12 Pages.

Stott, Lee, "Mixed Reality Immersive—A Beginners guide to building for MR", Retrieved From https://blogs.msdn.microsoft.com/uk_faculty_connection/2017/10/09/mixed-reality-immersive-a-beginners-guide-to-building-for-mr/, Oct. 9, 2017, 35 Pages.

"International Search Report and Written Opinion Issued in PCT Application No. PCT/US2019/030788", dated Jul. 11, 2019, 13 Pages.

* cited by examiner

MULTIPLE USERS DYNAMICALLY EDITING A SCENE IN A THREE-DIMENSIONAL IMMERSIVE ENVIRONMENT

BACKGROUND

As use of head-mounted display devices becomes more prevalent, an increasing number of users can participate in an experience in which content is displayed via augmented reality techniques, mixed reality techniques, and/or virtual reality techniques. Furthermore, more and more people are wanting to create these experiences for a particular purpose (e.g., an employee training experience for new employee training, a marketing experience for potential purchasers of a service such as a vacation or an item such as a pair of skis, etc.).

However, creation of these experiences is typically limited to developers that possess high-level skills and technical capabilities. For example, to create an experience, a person must have the technical capability to program the spatial aspects of a three-dimensional scene, the motion of objects in the three-dimensional scene, the texture of objects in the three-dimensional scene, the lighting of objects in the three-dimensional scene, and so forth. The average person does not possess these high-level skills and technical capabilities, and thus, the average person is typically unable to create these types of experiences.

Furthermore, conventional platforms used to create these experiences are limited in that they do not provide an effective and efficient way for a group of users to create the experience together in a three-dimensional immersive environment. Stated another way, the conventional platforms do not enable a collaborative and interactive approach to creating an experience in a three-dimensional immersive environment.

SUMMARY

The techniques described herein provide a platform that enables multiple users to dynamically and concurrently create a scene of an experience that is viewable in a three-dimensional immersive environment. The three-dimensional immersive environment can be provided via a display of a head-mounted display device. The creation of the scene may be referred to herein as "editing" the scene. In other words, provided a "canvas" (e.g., a blank canvas, a canvas template with pre-configured three-dimensional content, a previously created canvas, etc.), multiple users can provide edits by altering existing content in the canvas, by adding content to the canvas, and/or by removing content from the canvas. The content can include three-dimensional content (e.g., three-dimensional objects) and two-dimensional content (e.g., a two-dimensional photo, a two-dimensional logo, etc.).

In various implementations described herein, the editing occurs while multiple users are concurrently viewing a scene in a three-dimensional immersive environment. Thus, the users can visually see updates to the scene in real-time and in a dynamic manner. Stated another way, while a first user is providing edits to content in the scene, the first user and other users can visually see the response to the content in the scene being edited by the first user. This enables a collaborative and interactive approach to scene editing and provides efficiencies with respect to scene creation. For instance, a scene created for augmented reality, mixed reality, and/or virtual reality experience can be complex and can include a large amount of content. Having multiple users providing concurrent input on scene creation allows the final scene to be realized in more effective and efficient manner.

To avoid problems and user frustrations that may occur when multiple users have the ability to edit a scene in a three-dimensional immersive environment, the techniques described herein use region locking so that content being edited by one user viewing and editing the scene in a three-dimensional immersive environment cannot be edited by another user concurrently viewing and editing the same scene in the three-dimensional immersive environment. A region comprises a three-dimensional space in the scene. The three-dimensional space in the scene consumed by a region includes a subset of a total amount of three-dimensional space in the scene. To this end, the scene can be divided into multiple regions. In a specific example, if the scene comprises a living room setting, then a first region can include a first three-dimensional space in which a couch is positioned, and a second region can include a second three-dimensional space, adjacent to the first three-dimensional space, in which a chair and a coffee table are positioned.

By dividing, or separating, the scene into multiple regions that can be locked, the techniques described herein provide an element of protection against user interference that can result when two users are editing, or attempting to edit, the same content. For instance, when a first user requests to edit first content (e.g., a three-dimensional object, a collection of three-dimensional objects, etc.) in the scene, a region of the scene in which the first content is positioned is locked so that other users are unable to edit content in the region even though they can dynamically preview the content being edited by the first user in real-time in the three-dimensional immersive environment. However, the other users can edit content in other regions of the scene outside the region that was locked for the first user. These other regions may be referred to as unlocked regions that are available for editing in a multi-user editing environment. Consequently, region locking limits user interference and further avoids user frustration and user distraction that can result when multiple users attempt to edit the same scene content in a three-dimensional immersive environment.

In various examples, the techniques described herein can be implemented via a Web-enabled application accessible via a browser executing on a head-mounted display device, or on a computing device connected to a head-mounted display device. The Web-enabled application can allow multiple users to access and edit a scene of an experience in a three-dimensional immersive environment. Accordingly, the Web-enabled application can include functionality that is executed: on a network device (e.g., a server of a network provider), on a head-mounted display device, on a computing device connected to a head-mounted display device, or across a combination of any of these devices. Alternatively, the techniques described herein can be implemented via an application executing on a user device (e.g., a head-mounted display device, a laptop, a smartphone, etc.) that is configured to communicate (e.g., peer-to-peer communications) with other user devices to enable a multi-user editing approach to a scene in a three-dimensional immersive environment.

While a region is locked for a user to edit content therein, the user is provided with editing controls. The editing controls for a region are specifically configured for a user for which the region is locked. Stated another way, other users cannot view and/or activate the editing controls for a locked region. The editing controls enable the user to add content, remove content, or alter content (e.g., change a property of an object) displayed in the scene. Consequently, the techniques described herein provide an ability for multiple users to implement a collaborative and interactive approach to scene creation in which each of the users can preview all the content in the scene, but individual users are limited to editing a subset of all the content in the scene via region locking.

In various examples, editing content may comprise moving content from one locked region to another. For example, a user may provide editing input to increase a size of an object so that the object is displayed outside a boundary of an initial locked region. In another example, a user may provide editing input to change the position of the object so that the object is partly positioned or fully positioned outside a boundary of an initial locked region. Therefore, in association with the moving, the techniques described herein can lock another region to which the content is moved so that other users are unable to edit content in the other region. Alternatively, in association with the moving, the techniques described herein can expand the initially locked region to include an area to which the object is moved.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical elements.

DETAILED DESCRIPTION

Techniques configured to enable multiple users to dynamically and concurrently edit a scene that is viewable in a three-dimensional immersive environment are described herein. The techniques use region locking so that content being edited by one user viewing and editing the scene in a three-dimensional immersive environment cannot be edited by another user concurrently viewing and editing the same scene in the three-dimensional immersive environment. Accordingly, a scene can be divided into multiple regions that can be locked to provide an element of protection against user interference that can result when two users are editing, or attempting to edit, the same content.

Various examples, scenarios, and aspects are described below with reference to FIGS. 1-8.

Figure 1:
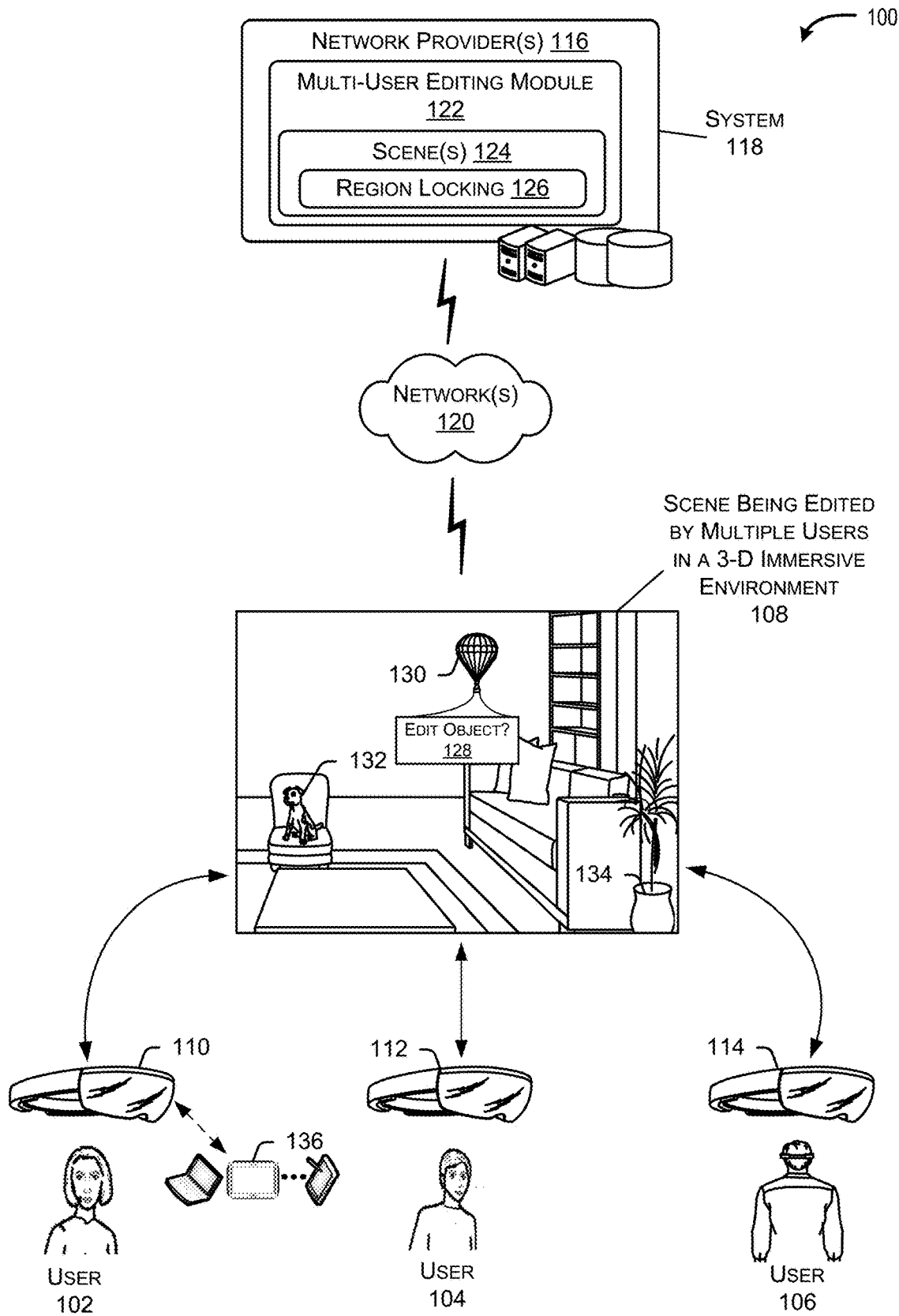
FIG. 1 is a diagram illustrating an example of how multiple different users can dynamically and concurrently edit a scene in a three-dimensional immersive environment.

FIG. 1 is a diagram 100 illustrating an example of how multiple different users (e.g., user 102, user 104, user 106) can dynamically and concurrently edit a scene 108 in a three-dimensional immersive environment. The editing of the scene 108 can be implemented via a head-mounted display device. That is, user 102 can use head-mounted display device 110 to view and/or to edit the scene 108. User 104 can use head-mounted display device 112 to view and/or to edit the scene 108. User 106 can use head-mounted display device 114 to view and/or to edit the scene 108.

In various examples, a network provider 116 can operate a system 118 to enable access to, and creation of, the scene 108 over network(s) 120. In these examples, the network provider 116 includes a multi-user editing module 122 that can access scene(s) 124 (which include scene 108) and implement region locking 126 so that multiple users 102, 104, 106 can view the same scene and edit different content in the scene concurrently (e.g., at the same time).

Consequently, while viewing the scene 108 via head-mounted display device 110, user 102 can provide input requesting to edit content in a first region. For instance, user 102 can provide input (e.g., click on a graphical user interface control 128) to edit a balloon object 130 displayed in the scene. Similarly, while viewing the scene 108 via head-mounted display device 112, user 104 can provide input requesting to edit content in a second region (e.g., a dog object 132 displayed in different space of the scene). And while viewing the scene 108 via head-mounted display device 114, user 106 can provide input requesting to edit content in a third region (e.g., the plant object 134 displayed in different space of the scene). As further described herein, the regions comprise different three-dimensional spaces in the scene 108. Via region locking, the users 102, 104, 106 can collaborate on the editing of scene without interfering with one another and/or frustrating one another with respect to the editing process. While three users are shown in FIG. 1, and further examples described herein, it is understood in the context of this disclosure that any numbers of users can concurrently edit a scene (e.g., two, four, five, ten, etc.)

As described above, a user can edit content in a locked region by altering existing content in the locked region (e.g., the balloon object 130, the dog object 132, the plant object 134), by adding content to the locked region, and/or by removing content from the locked region. When a region is locked for a specific user, the user is provided with editing controls for his or her locked region. Since the region is locked for the specific user, other users editing the scene cannot see the editing controls configured for the specific user. However, the other users can preview, in real-time, the results of any edits (e.g., the altering of a property of an object, the addition of an object, the removal of an object, etc.).

As used herein, a "control" can comprise a displayed graphical user interface (GUI) element (e.g., a button, an object, etc.) that is activated based on an interaction between the GUI element and user input (e.g., a user selects or clicks on the GUI element). A control can alternatively be configured to accept and/or detect other forms of input such as a recognized voice command or a detected gesture. Thus, a control may be configured to receive user input but may not necessarily be displayed as a GUI element.

An object can be a three-dimensional object (e.g., a figure, shape, etc.) or a two-dimensional object (e.g., an image such as a photo or a logo, a document, etc.). The object may be associated with a widget. A widget comprises information (e.g., instructions) useable to access and display data configured to model an object in a three-dimensional immersive environment. For example, a widget can comprise a uniform resource locator (URL) that refers to an accessible network location at which the data is stored and from which the data can be retrieved and rendered for display. Accordingly, while editing a locked region, a user can add an object to a scene and/or remove an object from a scene via the use of a widget. In some instances, a widget can be configured to access and display a collection of related objects that share an environment attribute. For instance, a widget may be configured to access a pair of skis, ski boots, and ski poles since they each share a common attribute—a single user uses them to ski down a hill. A widget may be selected from a library of available widgets stored locally at a user device or from a network library of available widgets stored remotely at the one or more network provider(s) 116 (note that network providers(s) may be disparate content and/or service provider(s)). In this situation, the widget, as well as the object and/or the collection of objects, can be retrieved and downloaded to the head-mounted display devices 110, 112, 114 via network(s) 120.

In addition to adding or removing an object, a user can alter or change a property of an object in a locked region. In various examples, a property of an object can comprise a transform property such as a display orientation of the object, a scale (e.g. a size) of the object, a shading of the object, or a texture of the object. A property of an object can also or alternatively comprise a display position of the object, whether the object is moveable or animated or is only displayed in a fixed location, whether a consuming user can move the object, a color of the object, a display association between the object and another object in the scene (e.g., a grouping of objects such that if a consuming user moves one object the other object also moves), or a display association between the object and another scene (e.g., if the user selects or clicks on the object then the user will be taken to another scene in the experience). Further properties of an object include: a sound associated with or produced by the object or a display ability of the object to adapt to a real-world scene (e.g., always place a picture on a real-world wall rather than on a real-world floor in an augmented or mixed reality environment).

In various examples, a computing device 136 connected to a head-mounted display device 110 can be used to establish a network connection and effect an edit while a user 102 is viewing the scene 108 via the head-mounted display device 110. Accordingly, in some instances, the head-mounted display device 110 may not include a processor or computer-readable media and/or cannot establish network connections on its own. Rather, the head-mounted display device 110 may comprise an output device configured to render data stored on the computing device 136 for display. Therefore, interfaces of the computing device 136 and the head-mounted display device 110 can be configured to communicate via a wired and/or wireless Universal Serial Bus ("USB") connection, a BLUETOOTH connection, a High-Definition Multimedia Interface ("HDMI") connection, and so forth.

Examples of a head-mounted display device include, but are not limited to: OCCULUS RIFT, GOOGLE DAYDREAM VIEW, MICROSOFT HOLOLENS, HTC VIVE, SONY PLAYSTATION VR, SAMSUNG GEAR VR, GOOGLE CARDBOARD, SAMSUNG HMD ODYSSEY, DELL VISOR, HP HEADSET, LENOVO EXPLORER, ACER HEADSET, ASUS WINDOWS MIXED REALITY HEADSET, or any augmented reality, mixed reality, and/or virtual reality devices.

A computing device 136 useable to edit a scene can include, but is not limited to: a game console, a desktop computer, a laptop computer, a gaming device, a tablet computer, a personal data assistant (PDA), a mobile phone/tablet hybrid, a telecommunication device, a network-enabled television, a terminal, an Internet of Things (IoT) device, a work station, a media player, or any other sort of computing device. In some implementations, a user device (e.g., a head-mounted display device, computing device 136) includes input/output (I/O) interfaces that enable communications with input/output devices such as user input devices including peripheral input devices (e.g., a game controller, a keyboard, a mouse, a pen, a voice input device, a touch input device, a gestural input device, and the like) and/or output devices including peripheral output devices (e.g., a display screen, a touch screen, a printer, audio speakers, a haptic output device, and the like).

Network(s), such as network(s) 120, can include, for example, public networks such as the Internet, private networks such as an institutional and/or personal intranet, or some combination of private and public networks. Network(s) can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) can utilize communications protocols, including packet-based and/or datagram-based protocols such as internet protocol (IP), transmission control protocol (TCP), user datagram protocol (UDP), or other types of protocols. Moreover, network(s) can also include a number of devices that facilitate network communications and/or form a hardware basis for the networks, such as switches, routers, gateways, access points, firewalls, base stations, repeaters, backbone devices, and the like.

In various examples, a user can access a template to start scene editing. The template can provide a starting point for scene creation. To this end, a template can be selected and retrieved from a library of available templates. A template comprises an environment file that includes representations of models (e.g., models that define the spatial geometry of a background for a three-dimensional scene, models that define the spatial geometry of a panorama for a three-dimensional scene, etc.).

Figure 2A:
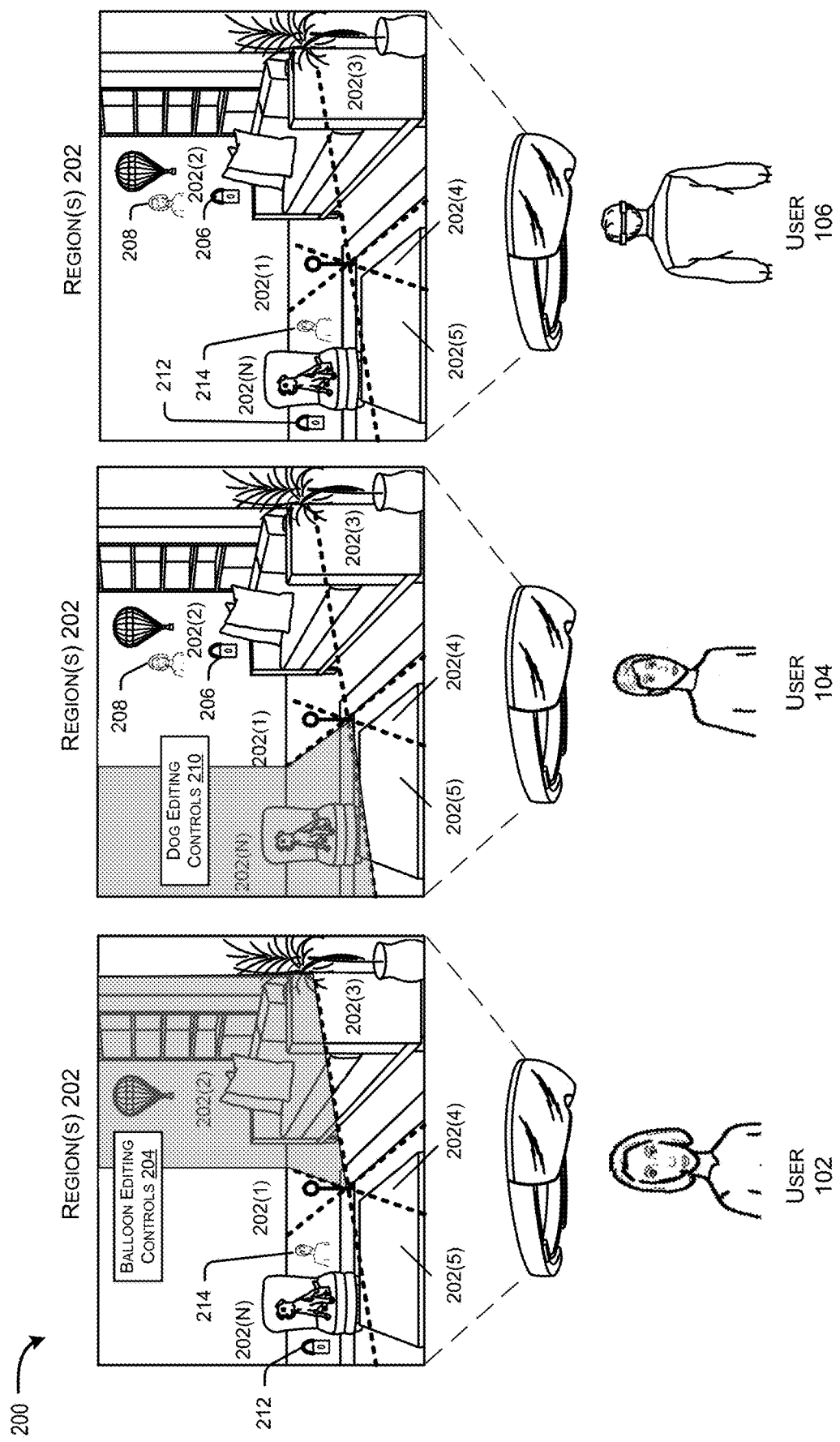
FIG. 2A is a diagram that illustrates an example of how a scene can be divided into multiple regions capable of being locked by users that are concurrently editing the scene.

FIG. 2A is a diagram 200 that illustrates an example of how a scene (e.g., scene 108) can be divided into multiple regions 202(1) through 202(N) (where N is a positive integer number) capable of being locked by users 102, 104, 106 that are concurrently editing the scene. The regions 202(1)

through 202(N) may be collectively referred to as regions 202. In this example, a number of regions 202 into which a scene is divided can include a predetermined number of regions (e.g., six regions as shown, two regions, three regions, four regions, ten regions, twenty regions, etc.).

Moreover, the three-dimensional space that a region consumes can be preconfigured. For instance, the diagram 200 of FIG. 2A illustrates that the scene is divided into regions 202(1) through 202(N) that comprise a three-dimensional space based on radial "lanes" or "zones". Using a point on the ground in the room setting of the scene (e.g., the middle of the room), an individual region comprises a three-dimensional space with a boundary (represented by the dashed lines) extended from the point to an edge (e.g., a wall) of the room. The boundaries for each region are determined based on an angle (e.g., the angles of each region may be the same or different) and the three-dimensional space includes the space between the ground and the ceiling.

Note that while each of users 102, 104, 106 are consuming the same scene via their respective head-mounted display devices, the actual content displayed to, and/or viewed by, an individual user at a given time may vary based on where the individual user has positioned himself or herself in the scene and/or how the individual user has oriented himself or herself in the scene (e.g., body orientation, head orientation, etc.).

Continuing the example of FIG. 1, user 102 may provide input requesting to edit the balloon object. Upon receiving this input and this request, the multi-user editing module 122 locks region 202(2) based on a position of the balloon object (e.g., the balloon object is positioned in region 202(2)). As shown in the view into the scene for user 102, region 202(2) is locked (e.g., shaded) to indicate to user 102 that other users 104, 106 consuming the scene cannot edit content in region 202(2). Once region 202(2) is locked, the multi-user editing module 122 configures balloon editing controls 204 for user 102 to interact with. Again, the balloon editing controls 204 are specific to user 102 since region 202(2) is locked for user 102.

Furthermore, the multi-user editing module 122 generates and displays a graphical indication to users 104, 106. One element 206 of the graphical indication can indicate that region 202(2) is locked, and therefore, is not available for users 104, 106 to edit. Another element 208 of the graphical indication can inform users 104, 106 of the identity of user 102 (e.g., display a photo, a name, or another form of a user identifier).

Similarly, user 104 may provide input requesting to edit the dog object. Upon receiving this input and this request, the multi-user editing module 122 locks region 202(N) based on a position of the dog object (e.g., the dog object is positioned in region 202(N)). As shown in the view into the scene for user 104, region 202(N) is locked (e.g., shaded) to indicate to user 104 that other users 102, 106 consuming the scene cannot edit content in region 202(N). Once region 202(N) is locked, the multi-user editing module 122 configures dog editing controls 210 for user 104 to interact with.

Furthermore, the multi-user editing module 122 generates and displays a graphical indication to users 102, 106. One element 212 of the graphical indication can indicate that region 202(N) is locked, and therefore, is not available for user 102, 106 to edit. Another element 214 of the graphical indication can inform users 102, 106 of the identity of user 104.

Via the display of the graphical indication, when user 106 joins the collaborative editing session and views the scene, he can quickly notice that regions 202(2) and 202(N) are already being edited by other users, and thus, are locked. Consequently, if user 106 wants to edit content, he will have to edit content within one or more of regions 202(1), 202(3), 202(4), and 202(5) that are available for editing.

In various examples, a region boundary is not fixed, but rather, an adjustable boundary. For instance, a boundary may be automatically adjusted by the multi-user editing module 122 so that content to be edited is completely positioned within a single region (e.g., an object does not span multiple regions). In the example diagram 200 of FIG. 2A, an angle can be changed to accommodate the complete placement of an object in one region.

While the example of FIG. 2A is implemented in response to a user request to edit an object, regions can also or alternatively be locked based on a general request to edit a region (e.g., the user does not have to request to edit a specific object). Accordingly, the multi-user editing module 122 may outline an initial set of regions and provide a control for a user to request to lock a particular region for editing. Once locked, the user can add content to the region, remove content from the region, and/or change a property of existing content in the region.

Figure 2B:
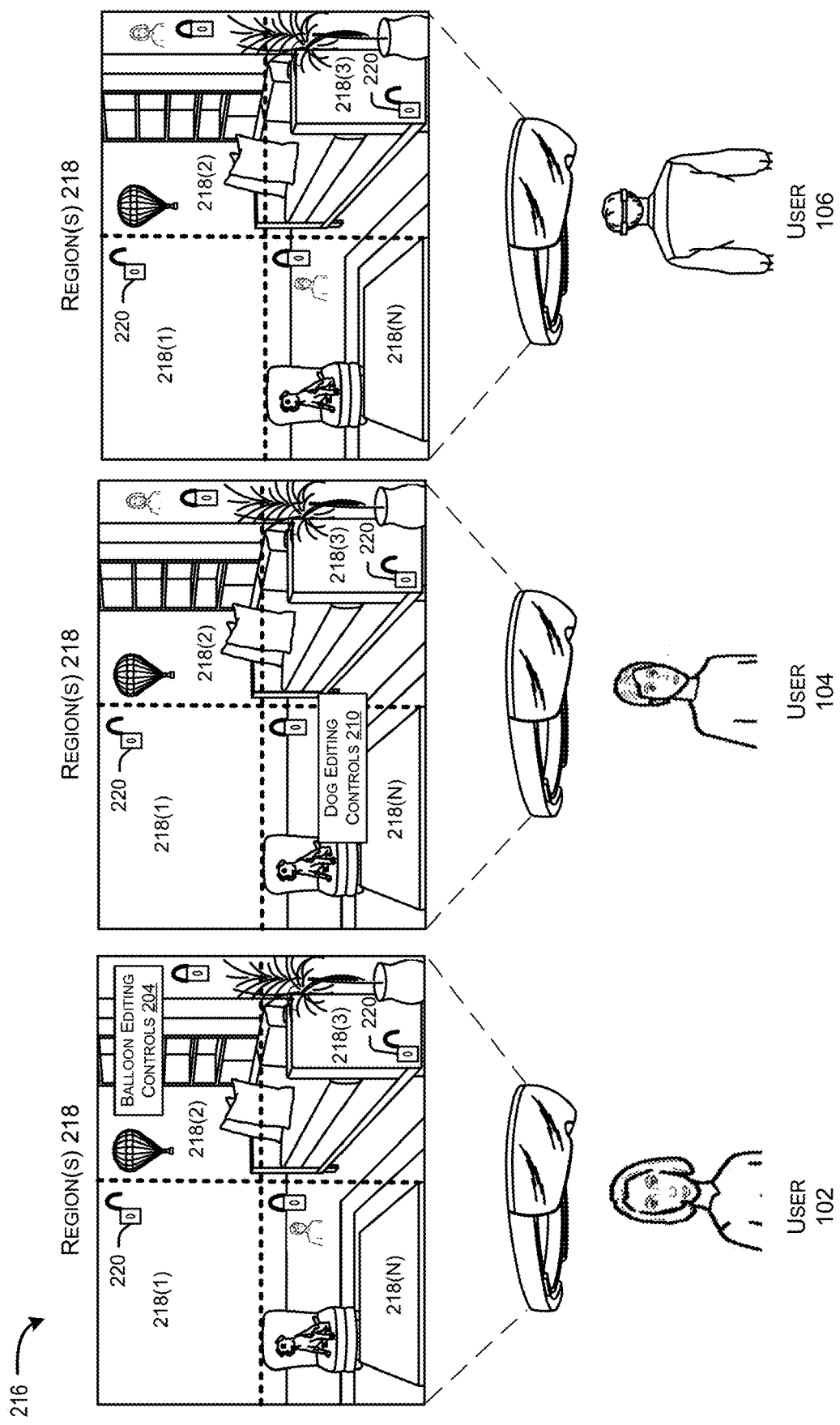
FIG. 2B is a diagram that illustrates another example of how a scene can be divided into multiple regions capable of being locked by users that are concurrently editing the scene.

FIG. 2B is a diagram 216 that illustrates another example of how a scene (e.g., scene 108) can be divided into multiple regions 218(1) through 218(N) (where N is a positive integer number) capable of being locked by users 102, 104, 106 that are concurrently editing the scene. The regions 218(1) through 218(N) may be collectively referred to as regions 218.

The diagram 216 of FIG. 2B illustrates a different way in which the scene can be divided into regions 218. In this example, a three-dimensional space of a region is based on a block. For instance, a first region 218(1) may be the upper left side of a room, a second region 218(2) may be the upper right side of the room, a third region 218(3) may be the lower right side of the room, and a fourth region 218(N) may the lower left side of the room. The number of regions may be a predetermined number and the size of the regions may be of equal or different size.

Revisiting the example of FIG. 1, user 102 may provide input requesting to edit the balloon object. Upon receiving this input and this request, the multi-user editing module 122 locks region 218(2) based on a position of the balloon object (e.g., the balloon object is positioned in region 218(2)). As shown in the view into the scene for user 102, region 218(2) is locked so that other users 104, 106 consuming the scene cannot edit content in region 218(2). Once region 218(2) is locked, the multi-user editing module 122 configures balloon editing controls 204 for user 102 to interact with.

Similar to the discussion above with respect to FIG. 2A, the multi-user editing module 122 generates and displays a graphical indication to users 104, 106. The graphical indication can indicate that region 218(2) is locked (via the "closed lock" symbol), and therefore, is not available for users 104, 106 to edit. The graphical indication can also inform users 104, 106 of the identity of user 102 (e.g., display a photo, a name, or another form of a user identifier).

Further, user 104 may provide input requesting to edit the dog object. Upon receiving this input and this request, the multi-user editing module 122 locks region 218(N) based on a position of the dog object (e.g., the dog object is positioned in region 218(N)). As shown in the view into the scene for user 104, region 218(N) is locked so that other users 102, 106 consuming the scene cannot edit content in region 218(N). Once region 218(N) is locked, the multi-user editing module 122 configures dog editing controls 210 for user 104 to interact with.

Similar to the discussion above with respect to FIG. 2A, the multi-user editing module 122 generates and displays a graphical indication to users 102, 106. The graphical indication can indicate that region 218(N) is locked (via the "closed lock" symbol), and therefore, is not available for users 102, 106 to edit. The graphical indication can also inform users 102, 106 of the identity of user 104.

The example diagram 216 of FIG. 2B shows that another graphical indication 220 (e.g., an "opened lock" symbol) can be associated with regions that are available for editing. Therefore, when user 106 joins the collaborative editing session and views the scene, he can quickly notice which regions 218(1) and 218(3) are available for editing.

Figure 3:
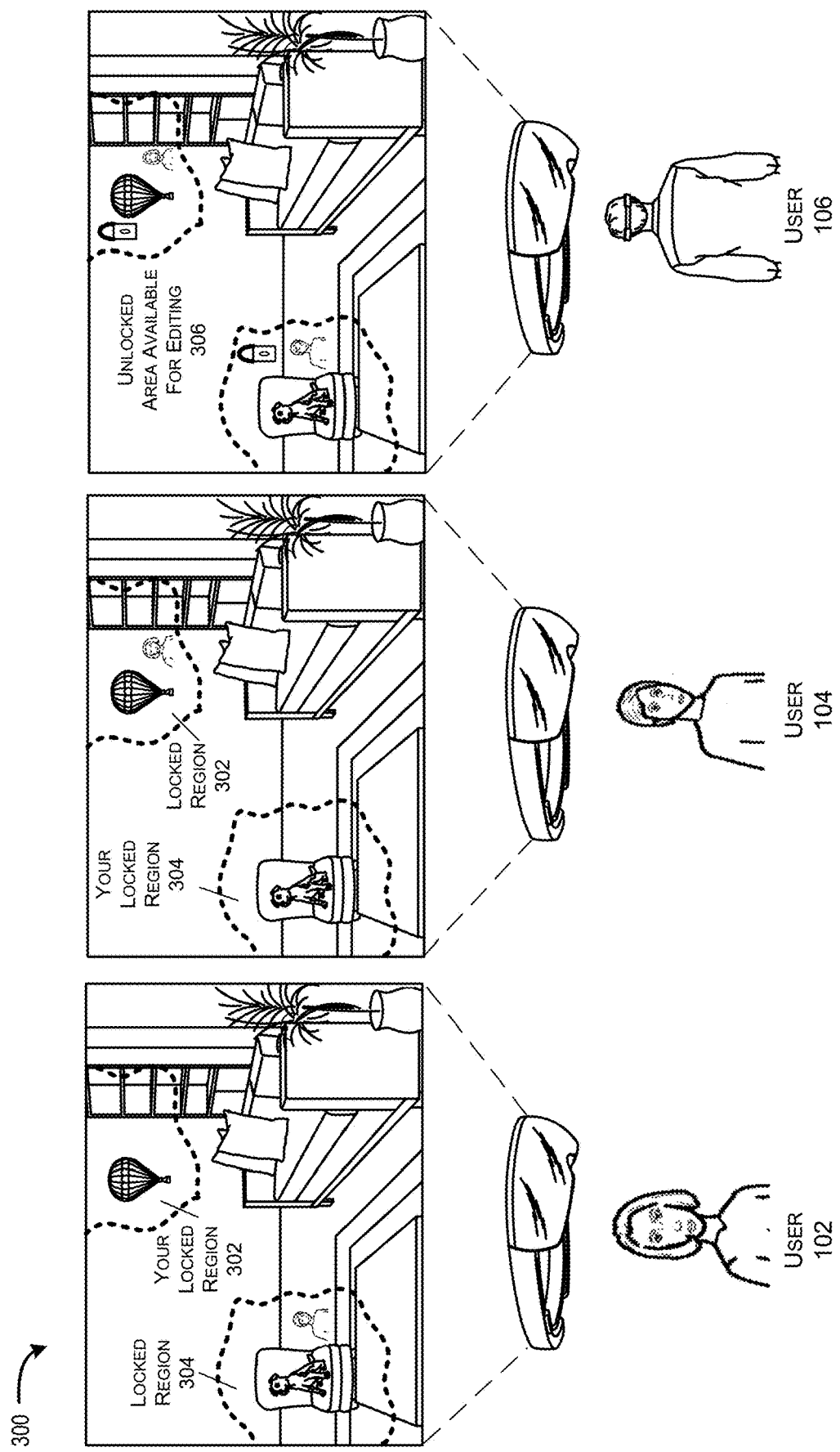
FIG. 3 is a diagram that illustrates yet another example of how a scene can be divided into multiple regions capable of being locked by users that are concurrently editing the scene.

FIG. 3 is a diagram 300 that illustrates yet another example of how a scene (e.g., scene 108) can be divided into multiple regions capable of being locked by users 102, 104, 106 that are concurrently editing the scene. In one example, the boundaries of a region in the diagram 300 of FIG. 3 can be defined based on user input. For instance, the user can outline a region that he or she wants to have locked for editing purposes. More specifically, the user can walk through and/or around the scene (e.g., the room) and a use a pointing mechanism to define boundaries of the region.

In another example, the boundaries of a region in the diagram 300 of FIG. 3 can be determined by the multi-user editing module 122. For instance, based on a request to edit an object, the multi-user editing module 122 can dynamically define the boundaries of a region in which the object lies. The boundaries may be determined based on a size of the object being edited, a position of the object relative to a position of another object in the scene (e.g., a connected or a related object) that has a property affected by the object being edited, a distance between a position of the object and a position of the user (e.g., the region includes both the object and the user), or a combination of these factors. Stated another way, the boundaries of the region can be defined by the multi-user editing module 122 to fully contain an object and/or to contain objects likely to be edited together.

As shown in the diagram 300 of FIG. 3, and again revisiting the example of FIG. 1, user 102 may provide input that defines boundaries of a region 302 that contains the balloon object and that is locked for user 102. The view into the scene provided to user 102 shows that region 302 is "your locked region". Moreover, the multi-user editing module 122 may define boundaries of a region 304 that contains the dog object and that is locked for user 104. The boundaries of this region 304 may be defined so that the dog object and the chair object are both completely within the region 304 since the chair is related or connected to the dog (e.g., the dog is sitting on the chair). Similarly, the view into the scene provided to user 104 shows that region 304 is "your locked region".

As described above, the multi-user editing module 122 generates and displays a graphical indication to user 106 indicating that regions 302 and 304 are locked (via the "closed lock" symbol) and that users 102 and 104 are the current editors of these regions. Moreover, the multi-user editing module 122 can provide a graphical indication of area(s) and/or content in the scene that are not locked and that are available for editing 306.

Figure 4:
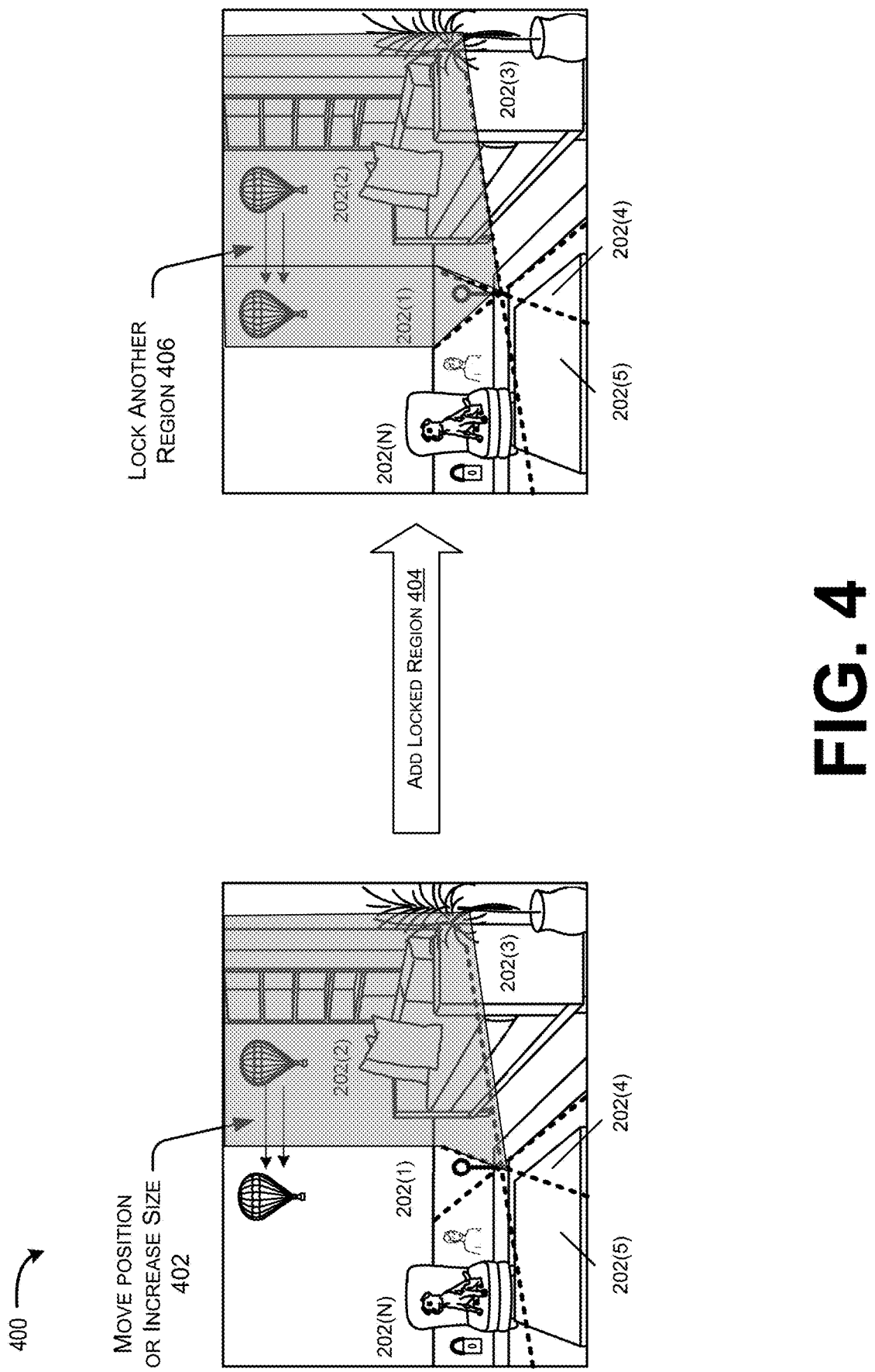
FIG. 4 is a diagram that illustrates an example of locking an additional region for a user based on content editing that occurs outside an initially locked region.

FIG. 4 is a diagram 400 that illustrates an example of locking an additional region for a user based on content editing that occurs outside an initially locked region. On the left side, the diagram 400 starts with a view into the scene provided to user 102, as illustrated in FIG. 2A (e.g., region 202(2) is locked for user 102 so she can edit the balloon object). As shown, user 102 may move 402 the balloon object from a position in locked region 202(2) to a position in unlocked region 202(1) which is not yet locked for user 102. Alternatively, the user may increase 402 a size of the balloon object so it spans both locked region 202(2) and unlocked region 202(1).

Based on this editing input, the multi-user editing module 122 is configured to add a locked region 404 for user 102. On the right side, the diagram 400 illustrates an updated view into the scene provided to user 102, in which the multi-user editing module 122 also locks 406 region 202(1) for user 102 (e.g., region 202(1) is also shaded to the user 102 can continue to edit the balloon object without interference from others). Consequently, the user 102 is provided with an expanded locked area in the scene (e.g., multiple locked regions).

Figure 5:
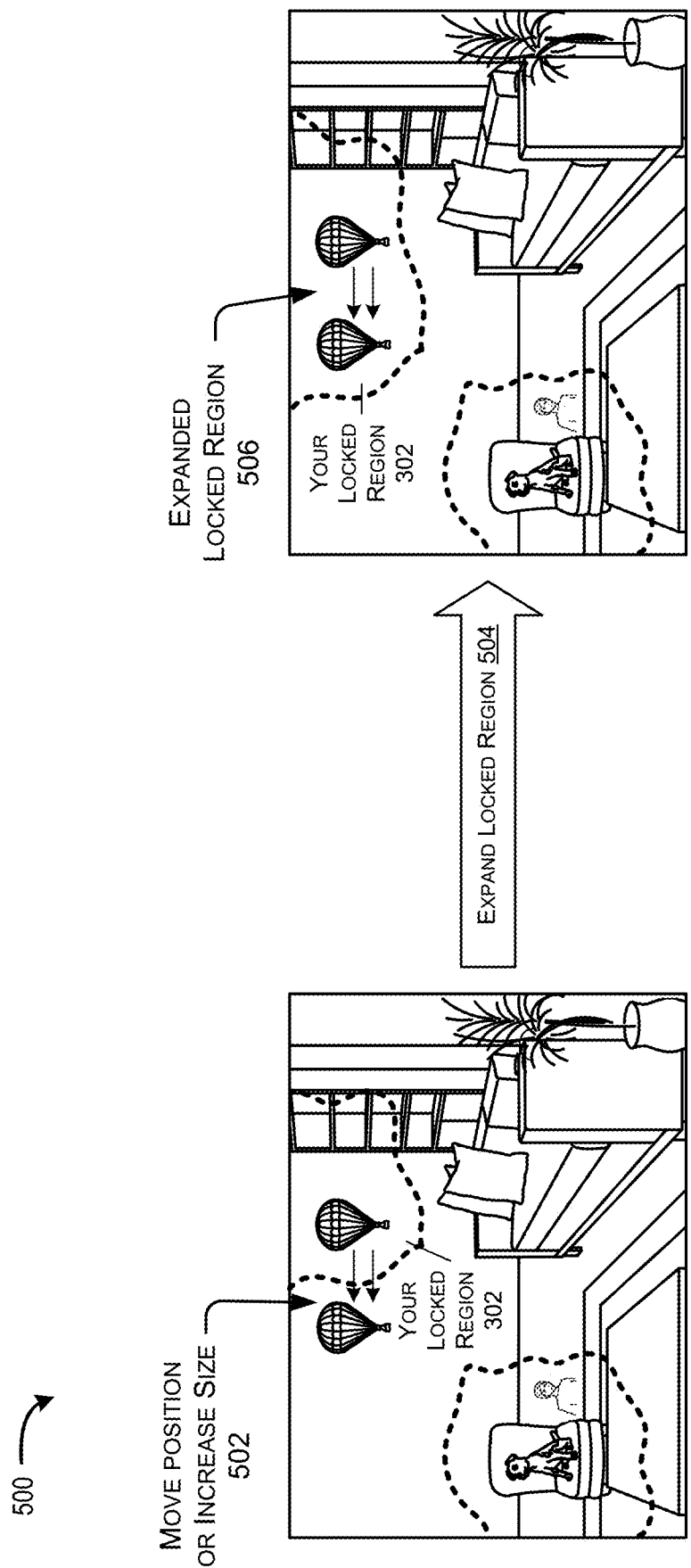
FIG. 5 is a diagram that illustrates an example of expanding a locked region for a user based on content editing that occurs outside an initially locked region.

FIG. 5 is a diagram 500 that illustrates an example of expanding a locked region for a user based on content editing that occurs outside an initially locked region. On the left side, the diagram 500 starts with a view into the scene provided to user 102, as illustrated in FIG. 3 (e.g., region 302 is locked for user 102 so she can edit the balloon object). As shown, user 102 may move 502 the balloon object from a position in locked region 302 to an area outside the locked region 302. Alternatively, the user may increase 502 a size of the balloon object so it spans the locked region 302 and the area outside the locked region.

Based on this editing input, the multi-user editing module 122 is configured to expand the locked region 504 for user 102. On the right side, the diagram 500 illustrates an updated view into the scene provided to user 102, in which the multi-user editing module 122 expands 506 the region 302 for user 102 so she can continue to edit the balloon object without interference from others. Consequently, the user 102 is again provided with an expanded locked area in the scene (e.g., an expanded locked region).

Figure 6:
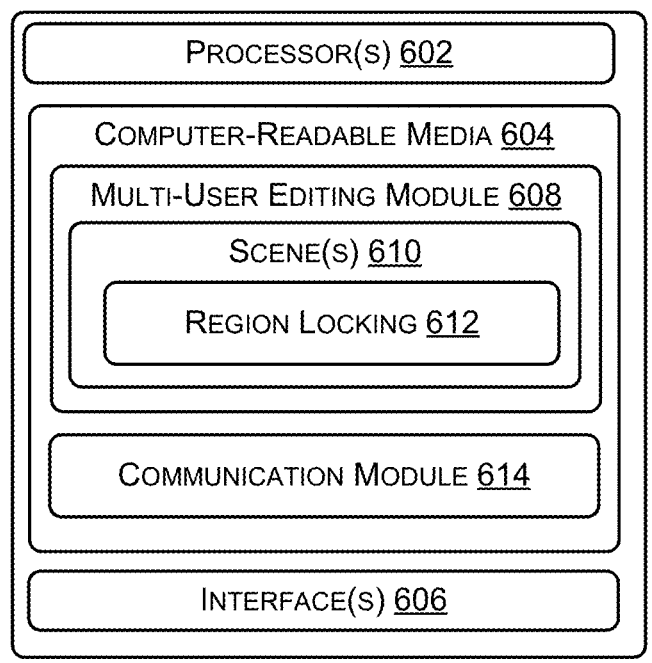
FIG. 6 is a diagram of an example device that can implement the techniques described herein.

FIG. 6 is a diagram of an example device 600 that can implement the techniques described herein. The device 600 can comprise a network device (e.g., a server that comprises or is part of a system 118), a head-mounted display device, and/or a computing device in communication with the head-mounted display device. For instance, the device 600 can include, but is not limited to: a server computer, a game console, a desktop computer, a laptop computer, a gaming device, a tablet computer, a personal data assistant (PDA), a mobile phone/tablet hybrid, a telecommunication device, a network-enabled television, a terminal, an Internet of Things (IoT) device, a work station, a media player, or any other sort of computing device.

The device 600 can include processor(s) 602 and computer-readable media 604. As used herein, a "processor" can represent, for example, a CPU-type processing unit, a GPU-type processing unit including a virtual GPU (VGPU), a field-programmable gate array (FPGA), a digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

As used herein, "computer-readable media" can store instructions executable by a processor and/or data (e.g., model data for a scene, a template, or an object). Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of memory included in a device and/or a hardware component that is part of a device or external to a device, including but not limited to random-access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

In some implementations, the device 600 includes input/output (I/O) interfaces that enable communications with input/output devices such as user input devices including peripheral input devices (e.g., a game controller, a keyboard, a mouse, a pen, a voice input device, a touch input device, a gestural input device, a motion input device, and the like) and/or output devices including peripheral output devices (e.g., a display screen, a printer, audio speakers, a haptic output device, and the like).

Device 600 also includes connection interfaces 606 that enable the device 600 to communicate over network(s) such as local area networks (LANs), wide area networks (WANs), satellite networks, cable networks, Wi-Fi networks, WiMax networks, mobile communications networks (e.g., 3G, 4G, and so forth), etc. In various implementations, connection interfaces 606 of a computing device and/or a head-mounted display device can be configured to operate in accordance with, and communicate over, a personal area network (PAN) that uses a wired and/or a wireless connection. For example, a PAN connection can operate in accordance with Infrared Data Association ("IrDA"), BLUETOOTH, wired and/or wireless USB, Z-Wave, ZIGBEE, or other short-range wireless technology.

The device 600 further includes a multi-user editing module 608 (e.g., multi-user editing module 122) that is configured to cause scene(s) 610 to be rendered and displayed to a plurality of users in a three-dimensional immersive environment via a plurality of head-mounted display devices. Moreover, the multi-user editing module 608 enables region locking 612 to be implemented in the scene(s) 610 so the users can concurrently edit separate content without interfering with other users' editing.

Furthermore, the device 600 can include a communication module 614 that can be executed in association with the multi-user editing module 608. The communication module 614 enables voice and/or messaging communications so the users can collaborate and interact with one another while they are concurrently editing a scene.

The modules provided in FIG. 6 are an example, and the number of modules used to implement the techniques described herein can vary higher or lower. That is, functionality described herein in association with the illustrated modules can be performed by a fewer number of modules or a larger number of modules on one device or spread across multiple devices.

Figure 7:
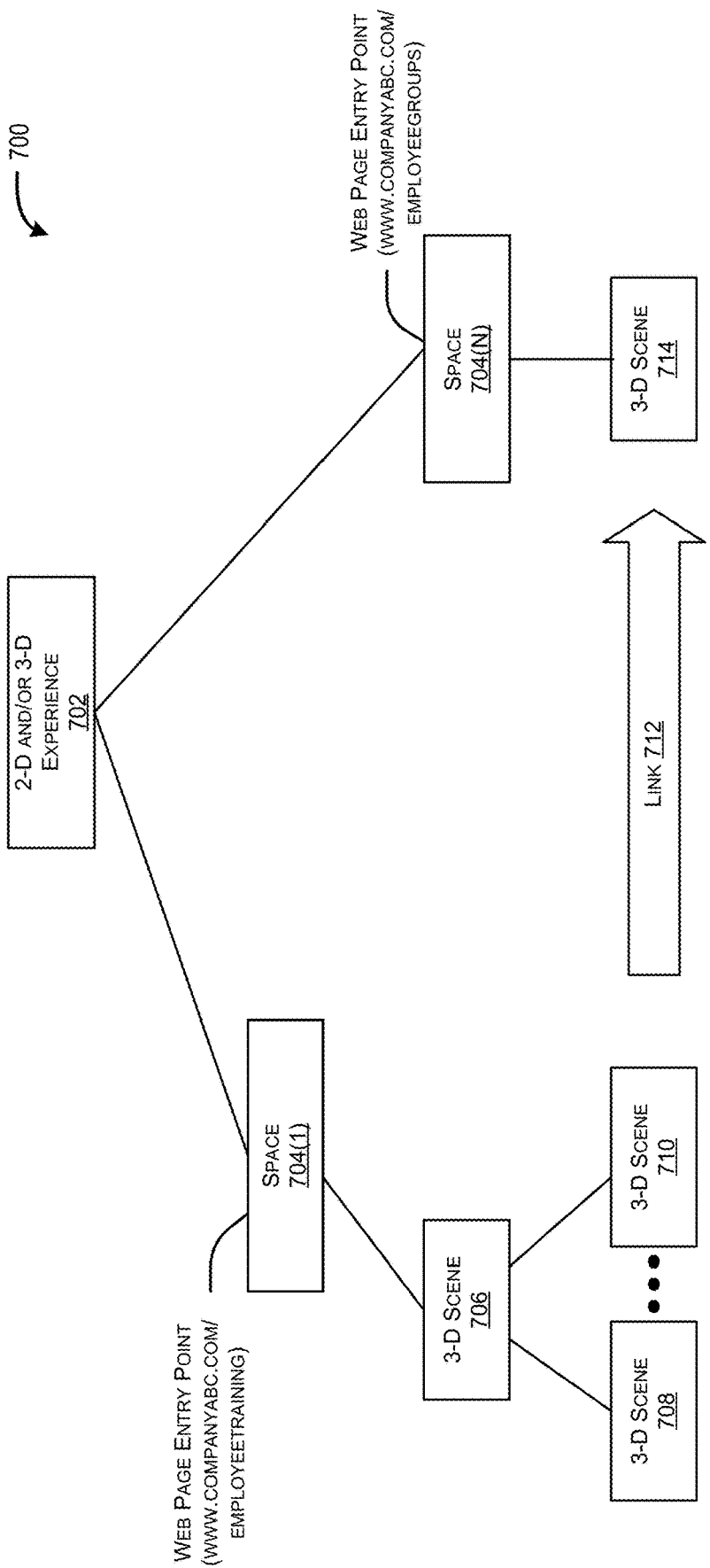
FIG. 7 is a diagram illustrating an example experience, of which scene(s) being concurrently being edited by multiple users can be a part.

FIG. 7 is a diagram 700 illustrating an example experience 702, of which scene(s) being concurrently being edited by multiple users can be a part. As shown, the experience 702 can include two-dimensional scenes and/or three-dimensional scenes. Generally, an experience 702 includes related and/or linked content that can be accessed and/or displayed for a particular purpose. As a specific example, the experience 702 can include company content an employer wants a new employee to know, to be informed about, or to learn, and thus, the new employee can access the experience 702 when he or she starts a new job. In another specific example, the experience 702 can include lesson content a school teacher wants a student to know, to be informed about, or to learn, and thus, the student can access the experience when he or she dives into a particular lesson. In accordance with these examples and others, the display of restricted and/or tailored content based on user identities can be implemented.

An experience 702 can include one or more spaces 704(1) through 704(N) (where N is a positive integer number such as one, two, three, four, and so forth). A space comprises a segment or type of content within the broader experience 702. There is no limitation how one segment or type of content can be distinguished from another segment or type of content in the same experience 702. Moreover, an experience may only include a single space. Continuing an example from above and to further illustrate, space 704(1) can include company content that relates to job training for a new employee, while space 704(N) can include company content related to different interest and activity groups for which the employer provides a budget (e.g., a hiking group, a skiing group, a chess group, a religious study group, etc.). The employer may have a policy to inform a new employee about these interest and activity groups when he or she starts a new job, so the new employee can join if a common interest is shared. This example shows how the two types of content relate to a situation where a new employee is beginning employment with a company, yet the types of content are different and therefore different spaces can be created and/or consumed within a broader experience 702.

As described above, a space can include three-dimensional scenes. In various implementations, an entry point for a user to consume a space can comprise a Web page or an Intranet page (e.g., a URL), accessed via a head-mounted display device or a computing device connected to the head-mounted display device. For instance, a new employee can visit "www.companyABC.com/employeetraining" on his or her computing device to enter space 704(1) that is part of the broader experience 702. The new employee can also visit "www.companyABC.com/employeegroups" on his or her computing device to enter space 704(N) that is part of the broader experience 702. In a specific example, space 704(1) may include a home page that displays two-dimensional content (e.g. text and a few images). This home page may include a first link to three-dimensional scene 706, which may contain links to three-dimensional scene 708 and three-dimensional scene 710. The three-dimensional scenes 706, 708, and 710 may also include links, or anchor points, that enable navigation to one another in a three-dimensional immersive environment. The new employee can consume the three-dimensional scenes 706, 708, and 710 in a three-dimensional immersive environment using a head-mounted display device. These three-dimensional scenes 706, 708, and 710, can also comprise URLs that are part of the Web page (e.g., "www.companyABC.com/employeetraining/3Dscene708" and "www.companyABC.com/employeetraining/3Dscene710"). Moreover, a scene 710 in a first space 704(1) can provide a link 712 (e.g., via the selection of a two-dimensional or three-dimensional object) to a three-dimensional scene 714 in a second space 704(N).

Accordingly, the editing of scenes, as described herein, can be implemented in association with creation of an experience 702 designed for a particular type of user (e.g., a new employee, a student of a class, etc.). In various examples, the experience 702 can be associated with one or more Web pages, yet aspects of the experience 702 can include, for example, one or more virtual reality (VR) three-dimensional scenes, one or more augmented reality (AR) three-dimensional scenes, and/or one or more mixed reality (MR) three-dimensional scenes. While the experience 702 shown in the example diagram 700 of FIG. 7 shows a limited number of spaces and scenes, it is understood in the context of this disclosure, that an experience can include any number of spaces (e.g., one, two, three, four, five, ten, twenty, one hundred) for related content and any number of scenes (e.g., one, two, three, four, five, ten, twenty, one hundred, etc.).

Figure 8:
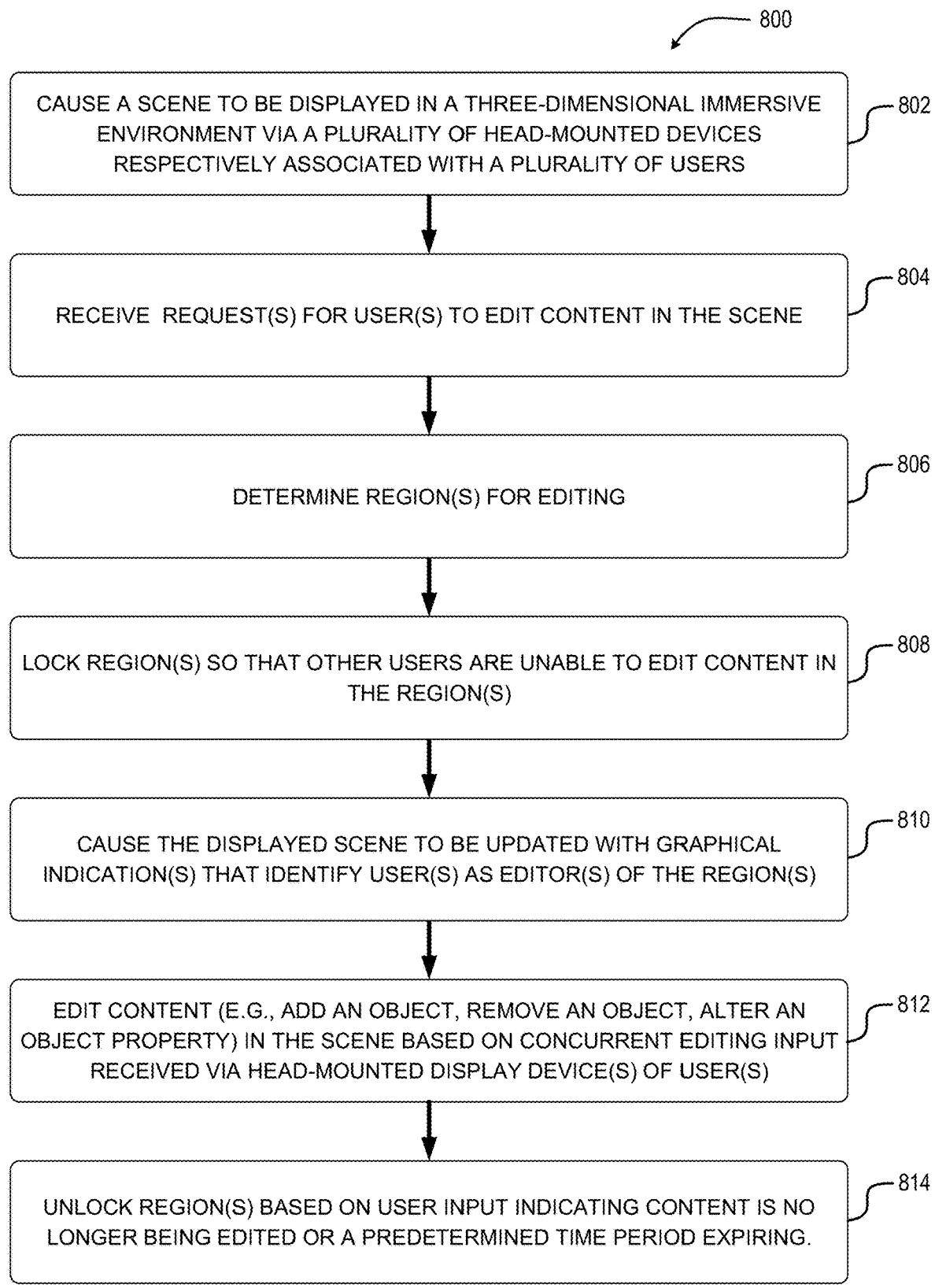
FIG. 8 is a diagram of an example flowchart that illustrates operations directed to enabling multiple users to concurrently edit content of a scene displayed in three-dimensional immersive environment.

FIG. 8 contains a flowchart of a method. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, wearable computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Additionally, the operations described herein can be implemented as a sequence of computer implemented acts or program modules running on a computing system (e.g., system 118, a head-mounted display device 110, computing device 136, and/or device 600).

FIG. 8 is a diagram of an example flowchart 800 that illustrates operations directed to enabling multiple users to concurrently edit content of a scene displayed in three-dimensional immersive environment.

At operation 802, a scene is caused to be displayed in a three-dimensional immersive environment via a plurality of head-mounted display devices associated with a plurality of users. Due to the nature of a scene displayed in a three-dimensional immersive environment, the actual content displayed to, and/or viewed by, the users at a given time may vary based on where an individual user has positioned himself or herself in the scene and/or how the individual user has oriented himself or herself in the scene (e.g., body orientation, head orientation, etc.).

At operation 804, request(s) for user(s) to edit content in the scene are received. For example, a user may request to edit specific content (e.g., an object) displayed in the scene. In another example, a user may request to edit a region of the scene.

At operation 806, region(s) are determined for editing. Examples of how a scene can be divided into regions are provided above with respect to FIGS. 2A, 2B, and 3.

At operation 808, region(s) are locked based on the request(s) so that users other than the requesting user are unable to edit content in a region.

At operation 810, the displayed scene is caused to be updated with graphical indications that indicate region(s) are locked and/or that identify user(s) as editor(s) of the region(s).

At operation 812, content is edited in the scene based on concurrent editing input received from the plurality of users via the plurality of head-mounted display devices.

At operation 814, region(s) are unlocked based on user input indicating content is no longer being edited or a predetermined time period expiring.

The disclosure presented herein may be considered in view of the following example clauses.

Example Clause A, a method comprising: causing, by one or more processors, a scene to be displayed in a three-dimensional immersive environment via a plurality of head-mounted devices respectively associated with a plurality of users; receiving a request for a first user of the plurality of users to edit an object in the scene; determining a region of the scene based on a position of the object; locking the region so that users other than the first user are unable to edit content in the region; and causing the displayed scene to be updated with a graphical indication that identifies the first user as an editor of the region.

Example Clause B, the method of Example Clause A, wherein the scene is divided into a predetermined number of regions.

Example Clause C, the method of Example Clause A, wherein a size of the region is determined based on user input that defines boundaries of the region.

Example Clause D, the method of Example Clause A, wherein a size of the region is dynamically determined based on at least one of: a size of the object being edited, a position of another object that has a property affected by the object being edited, or a distance between a position of the object and a position of the user.

Example Clause E, the method of Example Clause A or Example Clause B, further comprising: receiving an instruction to move the object from the region to another region of the scene while the object is being edited by the first user; moving the object from the region to the other region based on the instruction; and in association with the moving, locking the other region so that the users other than the first user are unable to edit content in the other region.

Example Clause F, the method of Example Clause A or Example Clause B, further comprising: receiving an instruction to increase a size of the object so that the object spans the region and another region of the scene while the object is being edited by the first user; increasing the size of the object so that the object spans the region and the other region based on the instruction; and in association with the increasing, locking the other region so that the users other than the first user are unable to edit content in the other region.

Example Clause G, the method of any one of Example Clauses A, C, or D, further comprising: receiving an instruction to move the object to an area outside the region while the object is being edited by the first user; moving the object to the area outside the region based on the instruction; and in association with the moving, expanding the region to at least include the area outside the region.

While Example Clauses A through G are described above with respect to a method, it is understood in the context of this disclosure that the Example Clauses A through G can also or alternatively be implemented by a system (e.g., a device) or via computer-readable storage media.

Example Clause H, a system comprising: at least one processor; and memory storing instructions that, when executed by the at least one processor, cause the system to perform operations comprising: causing a scene to be displayed in a three-dimensional immersive environment via a plurality of head-mounted devices respectively associated with a plurality of users; receiving a request for a first user of the plurality of users to edit a region of the scene; locking the region so that users other than the first user are unable to edit content in the region; and causing the displayed scene to be updated with a graphical indication that identifies the first user as an editor of the region.

Example Clause I, the system of Example Clause H, wherein the scene is divided into a predetermined number of regions.

Example Clause J, the system of Example Clause H, wherein a size of the region is determined based on user input that defines boundaries of the region.

Example Clause K, the system of Example Clause H, wherein a size of the region is dynamically determined based on a size of an object within the region that is to be edited by the first user.

Example Clause L, the system of Example Clause H or Example Clause I, wherein the operations further comprise: receiving an instruction to move an object from the region to another region of the scene while the object is being edited by the first user; moving the object from the region to the other region based on the instruction; and in association with the moving, locking the other region so that the users other than the first user are unable to edit content in the other region.

Example Clause M, the system of Example Clause H or Example Clause I, wherein the operations further comprise: receiving an instruction to increase a size of an object so that the object spans the region and another region of the scene while the object is being edited by the first user; increasing the size of the object so that the object spans the region and the other region based on the instruction; and in association with the increasing, locking the other region so that the users other than the first user are unable to edit content in the other region.

Example Clause N, the system of any one of Example Clauses H, J, or K, wherein the operations further comprise: receiving an instruction to move an object from the region to an area outside the region while the object is being edited by the first user; moving the object from the region to the area outside the region based on the instruction; and in association with the moving, expanding the region to at least include the area outside the region.

Example Clause O, the system of any one of Example Clauses H through N, wherein the operations further comprise unlocking the region so that the users other than the first user are able to edit the content in the region, wherein the region is unlocked based at least in part on one of (i) user input indicating the first user is no longer editing the content in the region or (ii) a predetermined time period expiring.

While Example Clauses H through O are described above with respect to a system, it is understood in the context of this disclosure that the Example Clauses H through O can also or alternatively be implemented via a method or computer-readable storage media.

Example Clause P, a system comprising: at least one processor; and memory storing instructions that, when executed by the at least one processor, cause the system to perform operations comprising: causing a scene to be displayed in a three-dimensional immersive environment via a plurality of head-mounted devices respectively associated with a plurality of users; receiving a first request for a first user of the plurality of users to edit a first object positioned in a first region of the scene; receiving a second request for a second user of the plurality of users to edit a second object positioned in a second region of the scene; locking the first region of the scene so that users other than the first user are unable to edit content in the first region; locking the second region of the scene so that users other than the second user are unable to edit content in the second region; causing the displayed scene to be updated with (i) a first graphical indication that identifies the first user as an editor of the first region and (ii) a second graphical indication that identifies the second user as an editor of the second region; and changing properties of the first object and the second object in the scene based on concurrent editing input received via a first head-mounted display device associated with the first user and via a second head-mounted display device associated with the second user.

Example Clause Q, the system of Example Clause P, wherein the operations further comprise dividing the scene into a predetermined number of regions.

Example Clause R, the system of Example Clause P or Example Clause Q, wherein the operations further comprise: receiving an instruction to move the first object from the first region to a third region of the scene while the first object is being edited by the first user; moving the first object from the first region to the third region based on the instruction;

and in association with the moving, locking the third region so that the users other than the first user are unable to edit content in the third region.

Example Clause S, the system of Example Clause P, wherein the operations further comprise: receiving an instruction to move the first object to an area outside the first region while the first object is being edited by the first user; moving the first object to the area outside the first region based on the instruction; and in association with the moving, expanding the first region to include the area outside the first region.

Example Clause T, the system of any one of Example Clauses P through S, wherein the operations further comprise unlocking the first region or the second region of the scene based at least in part on one of (i) user input indicating the first object or the second object is no longer being edited or (ii) a predetermined time period expiring.

While Example Clauses P through T are described above with respect to a system, it is understood in the context of this disclosure that the Example Clauses P through T can also or alternatively be implemented via a method or computer-readable storage media.

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   causing, by one or more processors, a scene to be displayed in a three-dimensional immersive environment via a plurality of head-mounted devices respectively associated with a plurality of users, wherein the scene includes a plurality of non-overlapping objects capable of being separately edited by individual ones of the plurality of users;
   receiving a request for a first user of the plurality of users to edit an object of the plurality of non-overlapping objects in the scene;
   dividing the scene into multiple non-overlapping three-dimensional regions, wherein a number of the multiple non-overlapping three-dimensional regions is a predetermined number established independent of content displayed in the scene and independent of user input provided via the scene;
   locking a three-dimensional region, of the multiple non-overlapping three-dimensional regions, that includes the object and at least one other object, of the plurality of non-overlapping objects, so that users other than the first user are unable to edit the object and the at least one other object in the three-dimensional region; and
   causing the displayed scene to be updated with a graphical indication that identifies the first user as an editor of the three-dimensional region.

2. The method of claim 1, wherein the multiple non-overlapping three-dimensional regions comprise radial zones established based on a point in the scene and an angle used to configure a boundary for an individual radial zone, the boundary extending from the point in the scene to an edge of the scene.

3. The method of claim 2, wherein the point is located in a middle of the scene.

4. The method of claim 2, wherein the multiple non-overlapping three-dimensional region are of equal size.

5. The method of claim 1, wherein a size of the three-dimensional region is dynamically determined based on at least one of: a position of another object that has a property affected by the object being edited or a distance between a position of the object and a position of the user.

6. The method of claim 1, further comprising:
receiving an instruction to move the object from the three-dimensional region to another three-dimensional region, of the multiple non-overlapping three-dimensional regions, while the object is being edited by the first user;
moving the object from the three-dimensional region to the other three-dimensional region based on the instruction; and
in association with the moving, locking the other three-dimensional region so that the users other than the first user are unable to edit content in the other three-dimensional region.

7. The method of claim 1, further comprising:
receiving an instruction to increase a size of the object so that the object spans the three-dimensional region and another three-dimensional region, of the multiple non-overlapping three-dimensional regions, while the object is being edited by the first user;
increasing the size of the object so that the object spans the three-dimensional region and the other three-dimensional region based on the instruction; and
in association with the increasing, locking the other three-dimensional region so that the users other than the first user are unable to edit content in the other three-dimensional region.

8. The method of claim 1, further comprising:
receiving an instruction to move the object to an area outside the three-dimensional region while the object is being edited by the first user;
moving the object to the area outside the three-dimensional region based on the instruction; and
in association with the moving, expanding the three-dimensional region to at least include the area outside the three-dimensional region.

9. The method of claim 1, further comprising causing an indication that a second three-dimensional region, of the multiple non-overlapping three-dimensional regions, is available for editing in response to receiving the request.

10. A system comprising:
at least one processor; and
memory storing instructions that, when executed by the at least one processor, cause the system to perform operations comprising:
causing a scene to be displayed in a three-dimensional immersive environment via a plurality of head-mounted devices respectively associated with a plurality of users;
dividing the scene into multiple non-overlapping three-dimensional regions, wherein a number of the multiple non-overlapping three-dimensional regions is a predetermined number established independent of content displayed in the scene and independent of user input provided via the scene;
receiving a request for a first user of the plurality of users to edit a three-dimensional region of the multiple non-overlapping three-dimensional regions, wherein the three-dimensional region includes a plurality of non-overlapping objects capable of being separately edited by the first user;
locking the three-dimensional region so that users other than the first user are unable to edit content in the three-dimensional region; and
causing the displayed scene to be updated with a graphical indication that identifies the first user as an editor of the three-dimensional region.

11. The system of claim 10, wherein the multiple non-overlapping three-dimensional regions comprise radial zones established based on a point in the scene and an angle used to configure a boundary for an individual radial zone, the boundary extending from the point in the scene to an edge of the scene.

12. The system of claim 10, wherein a size of the three-dimensional region is dynamically determined based on a size of an object within the three-dimensional region that is to be edited by the first user.

13. The system of claim 10, wherein the operations further comprise:
receiving an instruction to move an object from the three-dimensional region to another three-dimensional region, of the multiple non-overlapping three-dimensional regions, while the object is being edited by the first user;
moving the object from the three-dimensional region to the other three-dimensional region based on the instruction; and
in association with the moving, locking the other three-dimensional region so that the users other than the first user are unable to edit content in the other three-dimensional region.

14. The system of claim 10, wherein the operations further comprise:
receiving an instruction to increase a size of an object so that the object spans the three-dimensional region and another three-dimensional region, of the multiple non-overlapping three-dimensional regions, while the object is being edited by the first user;
increasing the size of the object so that the object spans the three-dimensional region and the other three-dimensional region based on the instruction; and
in association with the increasing, locking the other three-dimensional region so that the users other than the first user are unable to edit content in the other three-dimensional region.

15. The system of claim 10, wherein the operations further comprise:
receiving an instruction to move an object from the three-dimensional region to an area outside the three-dimensional region while the object is being edited by the first user;
moving the object from the three-dimensional region to the area outside the three-dimensional region based on the instruction; and
in association with the moving, expanding the three-dimensional region to at least include the area outside the three-dimensional region.

16. The system of claim 10, wherein the operations further comprise unlocking the three-dimensional region so that the users other than the first user are able to edit the content in the three-dimensional region, wherein the three-dimensional region is unlocked based at least in part on one of (i) user input indicating the first user is no longer editing the content in the three-dimensional region or (ii) a predetermined time period expiring.

17. A system comprising:
at least one processor; and
memory storing instructions that, when executed by the at least one processor, cause the system to perform operations comprising:
causing a scene to be displayed in a three-dimensional immersive environment via a plurality of head-mounted devices respectively associated with a plurality of users;

dividing the scene into multiple non-overlapping three-dimensional regions, wherein a number of the multiple non-overlapping three-dimensional regions is a predetermined number established independent of content displayed in the scene and independent of user input provided via the scene;

receiving a first request for a first user of the plurality of users to edit a first object positioned in a first three-dimensional region of the multiple non-overlapping three-dimensional regions, wherein the first three-dimensional region includes a first plurality of non-overlapping objects capable of being separately edited by the first user;

receiving a second request for a second user of the plurality of users to edit a second object positioned in a second three-dimensional region of the multiple non-overlapping three-dimensional regions, wherein the second three-dimensional region includes a second plurality of non-overlapping objects capable of being separately edited by the second user;

locking the first three-dimensional region of the scene so that users other than the first user are unable to edit content in the first three-dimensional region;

locking the second three-dimensional region of the scene so that users other than the second user are unable to edit content in the second three-dimensional region;

causing the displayed scene to be updated with (i) a first graphical indication that identifies the first user as an editor of the first three-dimensional region and (ii) a second graphical indication that identifies the second user as an editor of the second three-dimensional region; and changing properties of the first object and the second object in the scene based on concurrent editing input received via a first head-mounted display device associated with the first user and via a second head-mounted display device associated with the second user.

18. The system of claim 17, wherein the multiple non-overlapping three-dimensional regions comprise radial zones established based on a point in the scene and an angle used to configure a boundary for an individual radial zone, the boundary extending from the point in the scene to an edge of the scene.

19. The system of claim 17, wherein the operations further comprise:

receiving an instruction to move the first object to an area outside the first three-dimensional region while the first object is being edited by the first user;

moving the first object to the area outside the first three-dimensional region based on the instruction; and in association with the moving, expanding the first three-dimensional region to include the area outside the first three-dimensional region.

20. The system of claim 17, wherein the operations further comprise unlocking the first three-dimensional region or the second three-dimensional region of the scene based at least in part on one of (i) user input indicating the first object or the second object is no longer being edited or (ii) a predetermined time period expiring.

* * * * *